United States Patent
Han et al.

(10) Patent No.: US 8,576,937 B2
(45) Date of Patent: Nov. 5, 2013

(54) PRECODING APPARATUS AND METHOD IN A WIRELESS COMMUNICATION SYSTEM USING MULTIPLE INPUT MULTIPLE OUTPUT

(75) Inventors: Jin-Kyu Han, Seoul (KR); Clerckx Bruno, Yongin-si (KR); Ju-Ho Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 749 days.

(21) Appl. No.: 12/055,811

(22) Filed: Mar. 26, 2008

(65) Prior Publication Data

US 2008/0240274 A1    Oct. 2, 2008

(30) Foreign Application Priority Data

Mar. 26, 2007   (KR) .................. 10-2007-0029478

(51) Int. Cl.
  *H04B 7/02*   (2006.01)
  *H04L 1/02*   (2006.01)
(52) U.S. Cl.
  USPC ........... 375/267; 455/132; 455/133; 455/137; 455/138; 455/504; 455/505; 455/506
(58) Field of Classification Search
  USPC ......................................... 375/267
  See application file for complete search history.

(56) References Cited

U.S. PATENT DOCUMENTS

| | | | |
|---|---|---|---|
| 7,508,880 B2 | 3/2009 | Yun et al. | |
| 2003/0124995 A1* | 7/2003 | Tanaka | 455/101 |
| 2005/0002325 A1 | 1/2005 | Giannakis et al. | |
| 2006/0029157 A1 | 2/2006 | Dabak et al. | |
| 2006/0093062 A1 | 5/2006 | Yun et al. | |
| 2007/0064829 A1* | 3/2007 | Zheng et al. | 375/267 |
| 2007/0280386 A1* | 12/2007 | Waes et al. | 375/347 |
| 2007/0291638 A1 | 12/2007 | Chae et al. | |
| 2008/0043867 A1* | 2/2008 | Blanz et al. | 375/260 |
| 2008/0219366 A1* | 9/2008 | Lau et al. | 375/260 |
| 2009/0117862 A1 | 5/2009 | Le Nir et al. | |
| 2009/0262719 A1* | 10/2009 | Shim et al. | 370/342 |

FOREIGN PATENT DOCUMENTS

| | | |
|---|---|---|
| KR | 1020060092880 | 8/2006 |
| KR | 1020060092991 | 8/2006 |
| KR | 1020060130062 | 12/2006 |
| WO | WO 2006/036052 | 4/2006 |

OTHER PUBLICATIONS

Blanz et al, Joint Signalling of Precoding Control Information and Channel Quality Indicators in a Cellular MIMO System, Aug. 18, 2006, pp. 1-19.*

* cited by examiner

*Primary Examiner* — Shuwang Liu
*Assistant Examiner* — Gina McKie
(74) *Attorney, Agent, or Firm* — The Farrell Law Firm, P.C.

(57) ABSTRACT

A transmission apparatus in a Multiple Input Multiple Output (MIMO)-based wireless communication system. The transmission apparatus includes at least two antenna groups each having at least two antennas, wherein the antenna groups are spaced apart by a first distance and transmit antennas in each antenna group are spaced apart by a second distance which is shorter than the first distance. A channel coding and modulation unit channel-codes and modulates a desired transmission data stream. A precoding unit precodes the channel-coded and modulated signal separately for each antenna group and each antenna in the same antenna group. Thereafter, a transmission processing unit transmission-processes the output signal from the precoding unit.

8 Claims, 7 Drawing Sheets

PRECODING APPARATUS AND METHOD IN A WIRELESS COMMUNICATION SYSTEM USING MULTIPLE INPUT MULTIPLE OUTPUT

PRIORITY

This application claims priority under 35 U.S.C. §119(a) to a Korean Patent Application filed in the Korean Intellectual Property Office on Mar. 26, 2007 and assigned Serial No. 2007-29478, the entire disclosure of which is incorporated herein by reference.

BACKGROUND OF THE INVENTION

1. Field of the Invention

The present invention relates generally to an apparatus and method for transmitting data using multiple antennas in a wireless communication system, and in particular, to an apparatus and method for precoding transmission data in transmitting data using Multiple Input Multiple Output (MIMO).

2. Description of the Related Art

Wireless communication systems have been developed to offer users mobility that allows users to travel freely. A typical example of such wireless communication systems may include a mobile communication system. The mobile communication system converts voice signals into electrical signals, processes them and carries them on a Radio Frequency (RF) thereby providing voice services to users.

With the rapid progress of the communication technology, the mobile communication system is evolving into a high-speed, high-quality wireless packet data communication system providing data services and multimedia services beyond the earlier voice-oriented services. Recently, various mobile communication standards, such as High Speed Downlink Packet Access (HSDPA) and High Speed Uplink Packet Access (HSUPA), both defined by $3^{rd}$ Generation Partnership Project (3GPP), High Rate Packet Data (HRPD) defined by $3^{rd}$ Generation Partnership Project-2 (3GPP2), and 802.16 defined by Institute of Electrical and Electronics Engineers (IEEE), have been developed to support the high-speed, high-quality wireless packet data transmission services.

The present $3^{rd}$ generation wireless packet data communication systems, such as HSDPA, HSUPA and HRPD, use such technologies as an Adaptive Modulation and Coding (AMC) method and a channel-sensitive scheduling method to improve transmission efficiency. With application of the AMC method, a transmitter can adjust the amount of transmission data according to the channel state. That is, in a poor channel state, the transmitter reduces the amount of transmission data to match a reception error probability to a desired level, and in a good channel state, the transmitter increases the amount of transmission data to efficiently transmit a large amount of information while matching the reception error probability to the desired level. With application of the channel-sensitive scheduling-based resource management method, the transmitter, since it selectively services a user with a good channel state among several users, increases system capacity when compared to a method of allocating a channel to a single user and servicing the user using the allocated channel. Such capacity increase is called multi-user diversity gain. In sum, the AMC method and the channel-sensitive scheduling method are methods for applying proper modulation and coding techniques at the most efficient time determined by partial channel state information fed back from a receiver.

To implement the AMC method and the channel-sensitive scheduling method, the receiver should feed back its channel state information to the transmitter. The channel state information fed back by the receiver is called a Channel Quality Indicator (CQI).

Recently, intensive research is being conducted to replace Code Division Multiple Access (CDMA), the multiple access scheme used in the $2^{nd}$ generation and $3^{rd}$ generation mobile communication systems, with Orthogonal Frequency Division Multiple Access (OFDMA) for the next generation mobile communication systems. 3GPP and 3GPP2 have started standardizing work on an evolved system using OFDMA. It is known that OFDMA will increase system capacity. In OFDMA, one of several causes of the capacity increase is its capability of performing scheduling in the frequency domain (Frequency Domain Scheduling). Having obtained capacity gain in the communication system using the time-varying channel characteristic through the channel-sensitive scheduling method, OFDMA is expected to obtain higher capacity gain with application of the frequency-varying channel characteristic. However, in order to support frequency-domain scheduling, the transmitter should have channel state information for each frequency. That is, there is a need for CQI feedback for each frequency, causing an increase in a load of CQI feedback.

In the next generation system, active research is being conducted on a MIMO technology based on multiple transmit/receive antennas. The term "MIMO" as used herein refers to a technology for simultaneously transmitting multiple data streams over the same resources using multiple transmit/receive antennas. In the good channel state, transmitting multiple low-modulation order data streams can increase the throughput at the same error probability, compared to increasing the modulation order. In the MIMO terminology, the dimension over which an individual data stream is transmitted is called a layer. As for the layer, a method of separately applying AMC according to the channel state is efficient in increasing system capacity. For example, Per Antenna Rate Control (PARC) is a technology for transmitting a different data stream via every transmit antenna, and its layer is a transmit antenna. Multiple transmit antennas experience different channels, and the PARC technique applies AMC such that a larger amount of data can be transmitted via a transmit antenna having a good channel state and a lesser amount of data can be transmitted via a transmit antenna with a poor channel state.

As another example, in the Per Common Basis Rate Control (PCBRC), its layer is a fixed transmission beam. Therefore, the PCBRC technique transmits a larger amount of data with a transmission beam having a good channel state, and transmits a lesser amount of data with a transmission beam having a poor channel state.

When MIMO is realized using multiple antennas, a precoding method is used to adaptively form a transmission beam according to the channel state. The term "precoding" as used herein refers to an operation in which a transmitter pre-distorts a transmission signal before transmitting the signal via a transmit antenna. If precoding is realized by linear combination, a precoding process can be expressed as shown in Equation (1), $$x = Es \qquad (1)$$

where "s" is a K×1 vector and denotes a desired transmission signal, and "x" is an M×1 vector and denotes an actual transmission signal. Further, "K" denotes the number of symbols simultaneously MIMO-transmitted over the same resources, and "M" denotes the number of transmit antennas. In addition, "E" is an M×K matrix and denotes precoding. That is, Equation (1) expresses an operation in which a MIMO transmitter with M transmit antennas applies a precoding scheme E when simultaneously transmitting K signal streams.

A precoding matrix E is adaptively determined according to a transmission MIMO channel. However, when a transmitter cannot acquire information on the transmission MIMO channel, it performs precoding according to the feedback information reported by a receiver. Accordingly, a precoding codebook including a finite number of precoding matrixes E is preset between the transmitter and the receiver. The receiver selects a precoding matrix E most preferred in the current channel state from among the precoding codebook, and feeds it back to the transmitter. Therefore, the transmitter performs MIMO transmission by applying this precoding matrix E.

The transmission signal of Equation (1), received over a MIMO channel H, is expressed as shown in Equation (2), $$y=Hx+z=HEs+z \quad (2)$$

where "y" and "z" are both an N×1 vector and denote signals and noise signals received at N receive antennas, respectively, and 'H' is an N×M matrix and denotes a MIMO channel. The received signals undergo a reception combining process so that a Signal-to-Interference and Noise Ratio (SINR) of a transmission signal stream for each layer is improved. A signal r that has undergone the reception combining process can be expressed as shown in Equation (3).

$$r=Wy=WHx+Wz=WHEs+Wz \quad (3)$$

In Equation (3), "W" is an N×N matrix and denotes a reception combining process, and "r" is an N×1 signal vector. Reception techniques such as interference cancellation and Maximum Likelihood (ML) reception can be further performed to normally receive the transmission signal stream of each layer.

The conventional precoding techniques can be classified into two types. First, there is a Discrete Fourier Transform (DFT)-based precoding matrix as a precoding technique designed so as to use a spatial correlation taking into account a linear array antenna whose elements are arrayed at regular intervals. Equation (4) represents a DFT-based precoding matrix E.

$$E = LF = \mathrm{diag}(e^{j\phi_1}, e^{j\phi_2}, \ldots, e^{j\phi_M}) \cdot \frac{1}{\sqrt{M}}\left[\exp\left(\pm j\frac{2\pi(m-1)(n-1)}{M}\right)\right]_{m=1,\ldots,M}^{n=1,\ldots,M} \quad (4)$$

In Equation (4), "F" denotes a DFT matrix or an Inverse Discrete Fourier Transform (IDFT) matrix, and "L" denotes a diagonal matrix for adjusting only the phase. A DFT-based precoding matrix, which uses the characteristic that the DFT matrix F forms spatial beams, shows excellent performance in the channel having a high spatial correlation.

Next, there is a Grassmannian Line Packing (GLP) precoding matrix designed in the antenna structure where there is no spatial correlation. The GLP precoding matrix, which improves precoding gain by extending a distance between precoding matrixes, is designed on the assumption that there is no spatial correlation. Although the DFT-based precoding matrix can also be applied to the antenna structure where there is no spatial correlation, it is known that the GLP precoding method has a better performance. Meanwhile, if there is no spatial correlation, applying PARC without precoding can also increase channel capacity. In this case, it is possible to express the precoding matrix as a unit matrix.

The precoding schemes are classified into a Single CodeWord (SCW) scheme and a Multi-CodeWord (MCW) scheme according to the number of coded packets from which multiple signal streams transmitted by the MIMO technique are generated. In the SCW scheme, one codeword is transmitted through a plurality of layers regardless of the number of layers. The MCW scheme transmits one codeword over each of multiple layers. The MCW scheme is advantageous in that a receiver can obtain additional gain through interference cancellation, because the receiver can determine success/failure in decoding of each codeword through Cyclic Redundancy Check (CRC) applied to every codeword. However, the MCW scheme, as it increases the number of transmission codewords, may consume additional resources which linearly increase to apply CRC, and may increase in the complexity of the receiver. A Dual CodeWord (DCW) scheme has been designed as a proposed trade-off for obtaining the rate improvement effect of the MCW scheme while compensating its disadvantages. In the DCW scheme, a maximum of two codewords are transmitted through multiple layers regardless of the number of layers.

Figure 1:
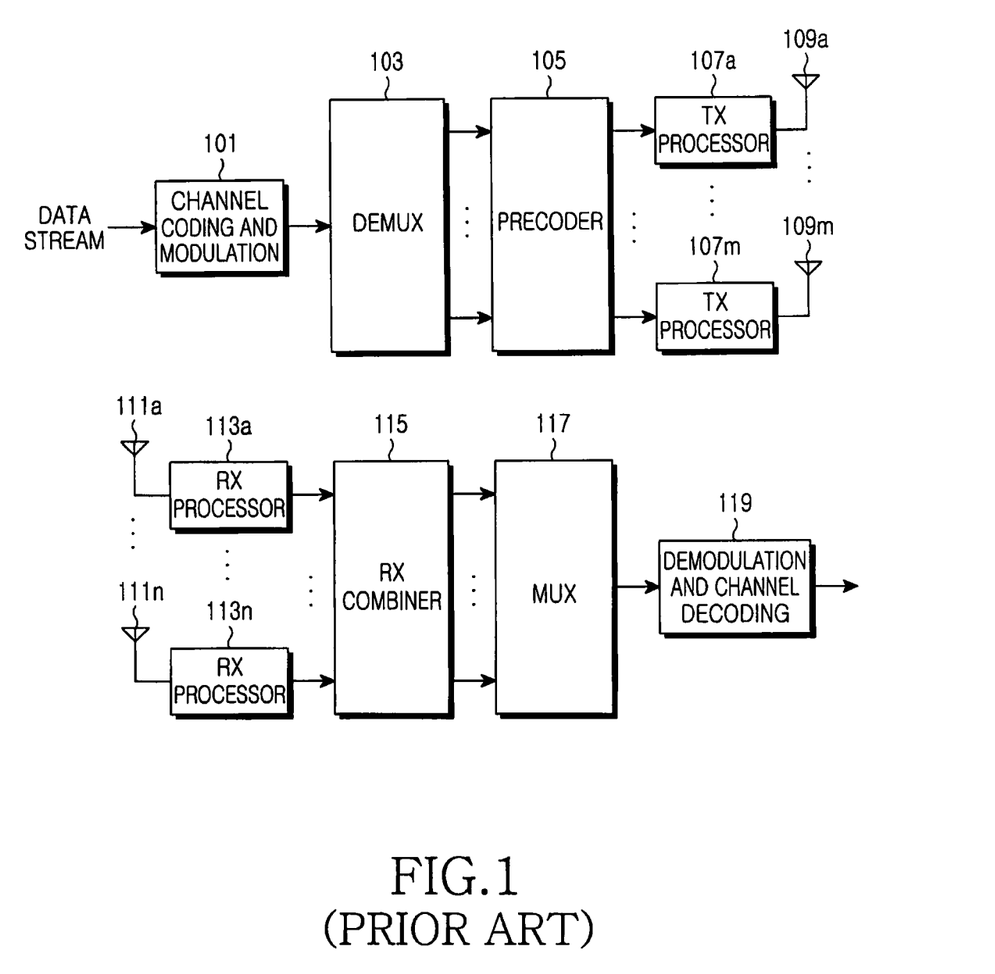
FIG. 1 is a diagram illustrating an example of a general SCW MIMO transceiver structure.

FIG. 1 is a diagram illustrating an example of a general SCW scheme-based MIMO (SCW MIMO) transceiver structure. With reference to FIG. 1, a description will be made of a general SCW MIMO transceiver structure.

A desired transmission data stream is input to a channel coding and modulation unit 101 where it is converted into one coded packet signal stream after undergoing a channel coding and modulation process. The signal converted into a packet signal stream is input to a demultiplexer 103 for MIMO transmission. The demultiplexer 103 demultiplexes the signal stream into K signal streams. The K signal streams demultiplexed in this way are linearly converted into M signal streams to be transmitted via associated transmit antennas by means of a precoder 105. The precoding process performed in the precoder 105 can be considered that K signal streams are processed such that they are transmitted through different transmission beams. The precoded M signal streams are transmitted via associated transmit antennas 109a through 109m by means of associated transmission processors 107a through 107m. The transmission processors 107a through 107m each includes not only the process of making CDMA or OFDMA signals but also the filtering and RF processing process performed in each antenna. The transmitted signals are received at N receive antennas 111a through 111n, and the signals received at the receive antennas 111a through 111n are restored to baseband signals by means of associated reception processors 113a through 113n. The reception-processed signals are output to a reception combiner 115 where they undergo signal combining separately for each transmit antenna. The signals combined separately for each transmit antenna are input to a multiplexer 117 where they are restored to the desired original transmission signal stream. Then the restored signal undergoes demodulation and channel decoding in a demodulation and channel decoding unit 119, restoring the desired original transmission data stream.

SCW MIMO is characterized in that since the transmitter generates multiple transmission signal streams by applying one channel coding and modulation unit 101, it only needs to receive one CQI feedback. However, the number of MIMO transmission signal streams, i.e., the number K of transmission MIMO layers, should be adjusted according to the channel state. The number K of transmission MIMO layers will be referred to herein as 'Rank'. Therefore, a feedback of SCW MIMO is composed of one CQI representing a channel state of transmission MIMO layers and the number Rank of transmission MIMO layers.

Figure 2:
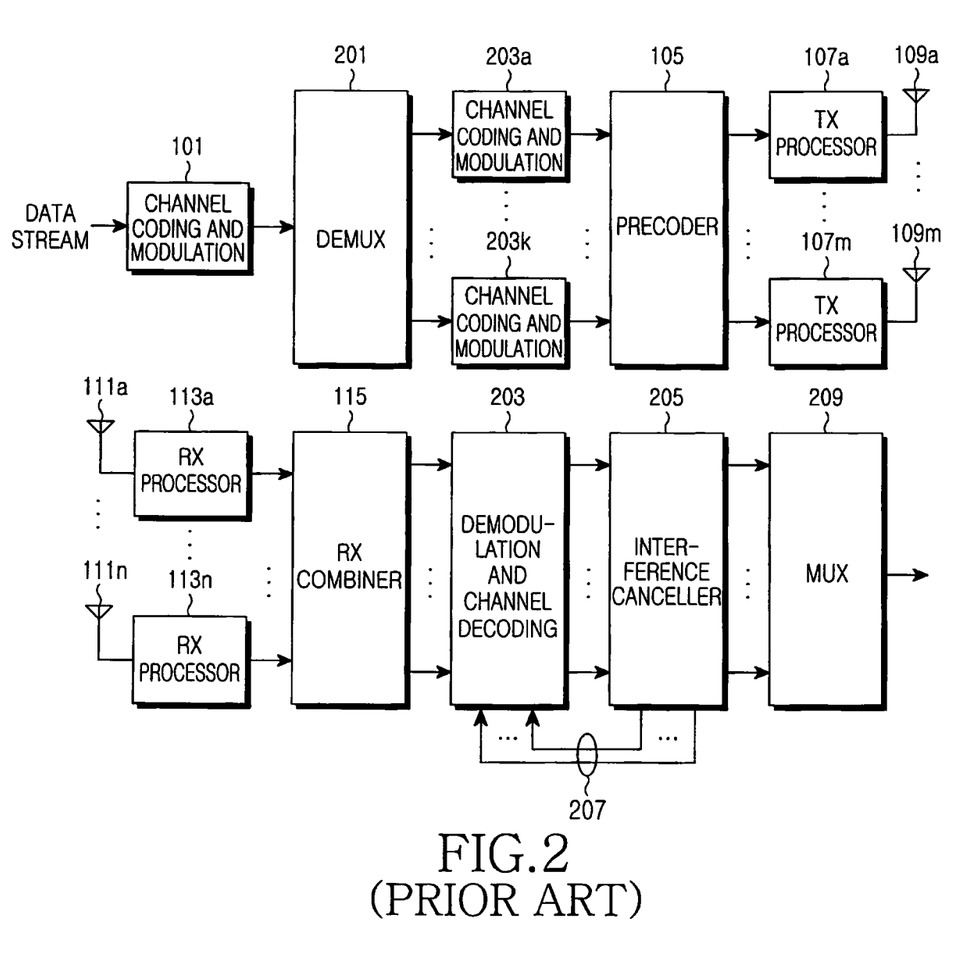
FIG. 2 is a diagram illustrating an example of a general MCW MIMO transceiver structure.

FIG. 2 is a diagram illustrating an example of a general MCW scheme MIMO (MCW MIMO) transceiver structure. With reference to FIG. 2, a description will now be made of an example of a general MCW MIMO transceiver structure.

In MCW MIMO, unlike in SCW MIMO, different coded packet signal streams are transmitted through individual MIMO layers. Therefore, a desired transmission data stream is input to a demultiplexer 201 where it is demultiplexed into as many signal streams as Rank. The demultiplexed signal streams are converted into signal streams associated to corresponding MIMO layers by means of different channel coding and modulation units 203a through 203k. In the following transmission process, the signal streams are transmitted using the same structure as that of the SCW MIMO transmitter. That is, the signals to be transmitted via M transmit antennas are generated by means of the precoding process and the transmission process for individual transmit antennas. It should be noted that the same or similar elements are denoted by the same reference numerals throughout FIGS. 1 and 2. However, in FIG. 2, channel coding and modulation processes 203a through 203k can be implemented with one channel coding and modulation unit. In this case, FIG. 2 is similar to FIG. 1 in terms of the channel coding and modulation process.

The MCW MIMO reception process is also similar to the process performed in the SCW MIMO receiver in several steps just after reception. That is, the MCW MIMO receiver and the SCW MIMO receiver use the same reception process of converting signals received via individual antennas into baseband signals, and the reception combining process of combining the received signals into transmission signals for individual layers. Therefore, the same elements are denoted by the same reference numerals. The restored signals may include mutual interference. The MCW MIMO receiver, since the transmission signals have undergone different coding and modulation for individual layers, can cancel a first restored signal of a particular layer to prevent the signal from causing interference to another layer. With application of such an interference canceller 205, it is possible to improve channel capacity of MIMO layers. As a result, it is possible to transmit more data through MCW MIMO transmission.

Although the receiver structure shown in FIG. 2 uses the interference canceller 205 by way of example, it can use a reception method of another type. Since the interference canceller 205 is used herein, a detailed description will be given below of the reception process based on the interference canceller 205 given in FIG. 2 by way of example.

When a signal of one layer is successfully restored by means of a demodulation and channel decoding unit 203, the interference canceller 205 cancels interference using the restored signal. The interference-canceled signal stream 207 is delivered back to the demodulation and channel decoding unit 203, and the restoration and interference cancellation is repeated until signals of all layers are successfully restored or there is no more signal of layers that will undergo restoration. Finally, the restored multiple signal streams for individual layers are restored to one desired transmission data stream by means of a multiplexer 209.

The MCW MIMO transmitter is characterized in that it should receive a CQI feedback for each layer since it generates multiple transmission signal streams by applying different channel coding and modulation units 203a through 203k for individual layers. Meanwhile, Rank can be implicitly expressed by setting a predefined CQI value indicating 'no-transmission' among CQI values, rather than separately feeding back CQIs. Therefore, in the MCW MIMO receiver, a feedback is composed of multiple CQIs representing channel states of individual transmission MIMO layers.

As described above, the SCW and MCW MIMO techniques have their advantages and disadvantages. Therefore, there is a need for a more effective MIMO technique.

SUMMARY OF THE INVENTION

The present invention has been designed to address at least the problems and/or disadvantages mentioned above and to provide at least the advantages described below. Accordingly, an aspect of the present invention is to provide a method and apparatus for transmitting and receiving data, using a method and apparatus for transmitting and receiving feedback information in a Multiple Input Multiple Output (MIMO)-based wireless communication system and the feedback information.

According to another aspect of the present invention, there is provided a method for transmitting feedback information from a receiver to a transmitter in a Multiple Input Multiple Output (MIMO)-based wireless communication system. The method includes estimating a state of a channel to the transmitter and selecting two precoding matrixes which are most preferred in the estimated channel state; and feeding back identification information for identifying the two selected precoding matrixes, to the transmitter.

According to another aspect of the present invention, there is provided an apparatus for transmitting feedback information from a receiver to a transmitter in a Multiple Input Multiple Output (MIMO)-based wireless communication system. The apparatus includes a channel estimation unit for estimating a state of a channel to the transmitter; and a feedback information transmitter for selecting two precoding matrixes which are most preferred in the estimated channel state and feeding back identification information for identifying the two selected precoding matrixes, to the transmitter.

According to another aspect of the present invention, there is provided a method for transmitting data at a transmitter in a Multiple Input Multiple Output (MIMO)-based wireless communication system. The method includes receiving identification information for identifying two precoding matrixes, from a receiver; and transmitting data using two precoding matrixes selected based on the identification information, wherein the identification information is information for indicating two precoding matrixes most preferred by the receiver based on a channel state estimated between the receiver and the transmitter.

According to another aspect of the present invention, there is provided an apparatus for transmitting data at a transmitter in a Multiple Input Multiple Output (MIMO)-based wireless communication system. The apparatus includes a receiving unit for receiving identification information for identifying two precoding matrixes from a receiver; and a transmission unit for transmitting data using two precoding matrixes selected based on the identification information, wherein the identification information is information for indicating two precoding matrixes most preferred by the receiver based on a channel state estimated between the receiver and the transmitter.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for clarity and conciseness. Terms used herein are defined based on functions in the present invention and may vary according to users, operators' intention or usual practices. Therefore, the definition of the terms should be made based on contents throughout the specification.

Figure 3:
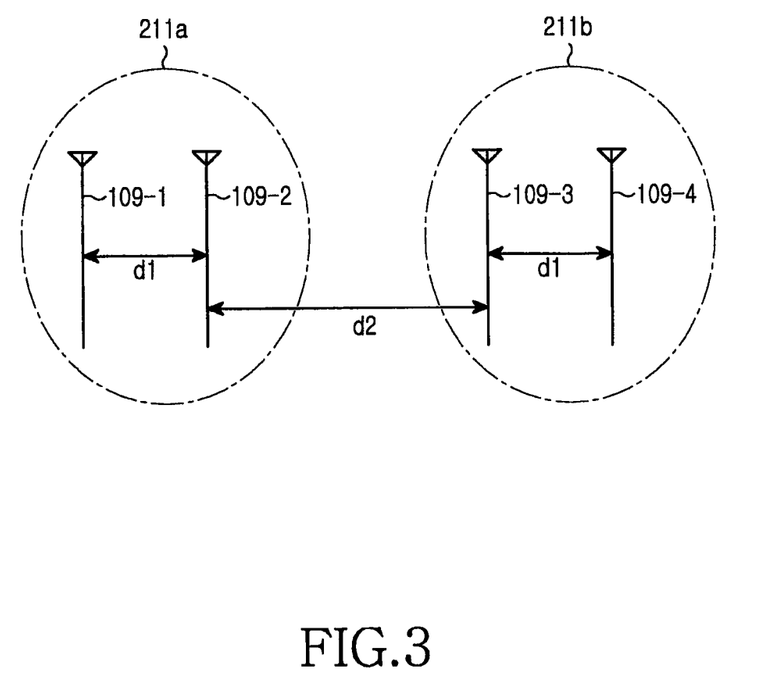
FIG. 3 is a diagram illustrating a structure of transmit antennas disposed at irregular intervals according to an embodiment of the present invention.

FIG. 3 is a diagram illustrating a structure of transmit antennas disposed at irregular intervals according to an embodiment of the present invention.

In FIG. 3 there are 4 transmit antennas 109-1, 109-2, 109-3 and 109-4. However, the present invention can be applied as long as more than four transmit antennas are disposed so as to satisfy the following rule. One transmit antenna group is composed of more than two antennas disposed at regular intervals, and even for the different transmit antenna groups, intra-group antennas are disposed at regular intervals. In addition, the transmit antenna groups are also disposed at regular intervals, and an interval between transmit antenna groups is set to a value greater than an intra-group antenna interval.

Referring to FIG. 3, reference numerals 211a and 211b represent a first and a second transmit antenna groups, respectively. The first antenna group 211a includes antennas 109-1 and 109-2, and the second antenna group 211b includes antennas 109-3 and 109-4. Both the first antenna group 211a and the second antenna group 211b have an inter-antenna interval of d1 in the antenna group. An interval between the first transmit antenna group 211a and the second transmit antenna group 211b is defined as an interval between the rightmost antenna 109-2 in the first transmit antenna group 211a and the leftmost antenna 109-3 in the second transmit antenna group 211b, and its value is d2. In the antenna structure proposed by the present invention, the inter-group interval (or distance) d2 is assumed to be greater than the inter-antenna interval (or distance) d1 in the antenna group.

In the example of FIG. 3, each transmit antenna group is composed of two transmit antennas, and two such transmit antenna groups are linearly arrayed. Giving a general definition thereof, each transmit antenna group is composed of Me linearly-arrayed transmit antennas, and Mg such transmit antenna groups are linearly arrayed.

The antenna array shown in FIG. 3 is used for the following purposes. Antennas in the same transmit antenna group are arrayed at the shorter interval d1 in order to increase a correlation of the spatial channel that a signal transmitted from each transmit antenna experiences. The increase in the spatial correlation is advantageous to beamforming. The term "beamforming" as used herein refers to transmitting a transmission signal stream so that it has directionality, and when multiple antennas are used and one beam is formed, it is possible to transmit one signal stream, thereby concentrating energy upon the beam. If a MIMO channel has a condition in which it can transmit multiple signal streams, a technique is also possible to form multiple beams and transmit an individual signal stream through each beam. Although a value of the typical d1 is a half wavelength of a carrier, it is also possible to increase the value of d1 within the scope where the spatial correlation is maintained at a predetermined level. The transmit antenna groups are arrayed at the longer interval d2, in order to decrease a correlation of the spatial channel that a signal transmitted from each transmit antenna group experiences. The decrease in the spatial correlation is advantageous to spatial diversity and/or spatial multiplexing. The spatial correlation decreases with an increase in the value of d2. In sum, the antenna array in the transmit antenna groups aims at beamforming, and the array of transmit antenna groups aims at spatial diversity and/or spatial multiplexing.

As described above, the MIMO technology has been developed to increase data rate by simultaneously transmitting multiple signal streams. However, it is not always possible to successfully transmit multiple signal streams even though both the transmitter and the receiver have multiple antennas. This is because the number of transmission signal streams should be determined according to the characteristic of the MIMO channel. The number of transmission signal streams is determined using the spatial correlation of the MIMO channel and the average SINR. The number of successfully transmittable signal streams can increase as the spatial correlation of the MIMO channel lowers and the average SINR increases.

The antenna array shown in FIG. 3 makes it easy to apply the MIMO technique. Beamforming concentrates energy by applying a weight to multiple antennas so that they are suitable for a channel for a particular user, and the use of beamforming can increase the average SINR. If an individual transmit antenna group is considered as one equivalent antenna, it is possible to operate an antenna in the transmit antenna group so that it may improve the average SINR through beamforming. However, if all antenna groups are arrayed at shorter intervals, since the spatial correlation increases, it is not possible to increase the data rate through the MIMO technique. If an individual transmit antenna group is considered as one equivalent antenna, it is possible to realize a MIMO channel having a low spatial correlation by extending the interval between transmit antenna groups.

The present invention provides a dual precoding technique that applies an intra-group precoding technique based on a high spatial correlation to a linear array antenna in a transmit antenna group, and applies an inter-group precoding technique based on a low spatial correlation in between the transmit antenna groups. If an intra-group precoding matrix is denoted by E1 and an inter-group precoding matrix is denoted by E2, an equivalent precoding matrix E can be expressed as shown in Equation (5).

$$E = E_2 \otimes E_1 \quad (5)$$

In Equation (5), $\otimes$ denotes calculation called Kronecker product. A Kronecker product, $C = A \otimes B$, of an m×n matrix A and a p×q matrix B is an (mp)×(nq) matrix. If $\alpha \equiv p(i-1)+k$ and $\beta \equiv q(j-1)+l$, it has a relation $c_{\alpha\beta} = a_{ij}b_{kl}$ of its elements. For example, if Kronecker product is performed on a 2×2 matrix A and a 3×2 matrix B, a 6×4 matrix defined as Equation (6) is obtained.

$$A \otimes B = \begin{bmatrix} a_{11}B & a_{12}B \\ a_{21}B & a_{22}B \end{bmatrix} = \begin{bmatrix} a_{11}b_{11} & a_{11}b_{12} & a_{12}b_{11} & a_{12}b_{12} \\ a_{11}b_{21} & a_{11}b_{22} & a_{12}b_{21} & a_{12}b_{22} \\ a_{11}b_{31} & a_{11}b_{32} & a_{12}b_{31} & a_{12}b_{32} \\ a_{21}b_{11} & a_{21}b_{12} & a_{22}b_{11} & a_{22}b_{12} \\ a_{21}b_{21} & a_{21}b_{22} & a_{22}b_{21} & a_{22}b_{22} \\ a_{21}b_{31} & a_{21}b_{32} & a_{22}b_{31} & a_{22}b_{32} \end{bmatrix} \quad (6)$$

For example, if an intra-group precoding matrix E1 and an inter-group precoding matrix E2 are defined in the sets shown as Equation (7), a set of an equivalent precoding matrix E can be expressed as Equation (8).

$$E_1 \in \left\{ F_0 = \frac{1}{\sqrt{2}} \begin{bmatrix} 1 & 1 \\ 1 & -1 \end{bmatrix}, F_1 = \frac{1}{\sqrt{2}} \begin{bmatrix} 1 & 1 \\ j & -j \end{bmatrix} \right\} \quad (7)$$

$$E_2 \in \left\{ I = \begin{bmatrix} 1 & 0 \\ 0 & 1 \end{bmatrix}, F_0 = \frac{1}{\sqrt{2}} \begin{bmatrix} 1 & 1 \\ 1 & -1 \end{bmatrix} \right\}$$

$$E \in \left\{ \frac{1}{\sqrt{2}} \begin{bmatrix} 1 & 1 & 0 & 0 \\ 1 & -1 & 0 & 0 \\ 0 & 0 & 1 & 1 \\ 0 & 0 & 1 & -1 \end{bmatrix}, \frac{1}{\sqrt{2}} \begin{bmatrix} 1 & 1 & 0 & 0 \\ j & -j & 0 & 0 \\ 0 & 0 & 1 & 1 \\ 0 & 0 & j & -j \end{bmatrix}, \right. \quad (8)$$

$$\left. \frac{1}{2} \begin{bmatrix} 1 & 1 & 1 & 1 \\ 1 & -1 & 1 & -1 \\ 1 & 1 & -1 & -1 \\ 1 & -1 & -1 & 1 \end{bmatrix}, \frac{1}{2} \begin{bmatrix} 1 & 1 & 1 & 1 \\ j & -j & j & -j \\ 1 & 1 & -1 & -1 \\ j & -j & -j & j \end{bmatrix} \right\}$$

As another example, if the intra-group precoding matrix E1 and the inter-group precoding matrix E2 are defined in the sets shown as Equation (9), a set of an equivalent precoding matrix E can be expressed as shown in Equation (10).

$$E_1, E_2 \in \left\{ F_0 = \frac{1}{\sqrt{2}} \begin{bmatrix} 1 & 1 \\ 1 & -1 \end{bmatrix}, F_1 = \frac{1}{\sqrt{2}} \begin{bmatrix} 1 & 1 \\ j & -j \end{bmatrix} \right\} \quad (9)$$

$$E \in \left\{ \frac{1}{2} \begin{bmatrix} 1 & 1 & 1 & 1 \\ 1 & -1 & 1 & -1 \\ 1 & 1 & -1 & -1 \\ 1 & -1 & -1 & 1 \end{bmatrix}, \frac{1}{2} \begin{bmatrix} 1 & 1 & 1 & 1 \\ j & -j & j & -j \\ 1 & 1 & -1 & -1 \\ j & -j & -j & j \end{bmatrix}, \right. \quad (10)$$

$$\left. \frac{1}{2} \begin{bmatrix} 1 & 1 & 1 & 1 \\ 1 & -1 & 1 & -1 \\ j & j & -j & -j \\ j & -j & -j & j \end{bmatrix}, \frac{1}{2} \begin{bmatrix} 1 & 1 & 1 & 1 \\ j & -j & j & -j \\ j & j & -j & -j \\ -1 & 1 & 1 & -1 \end{bmatrix} \right\}$$

Figure 4:
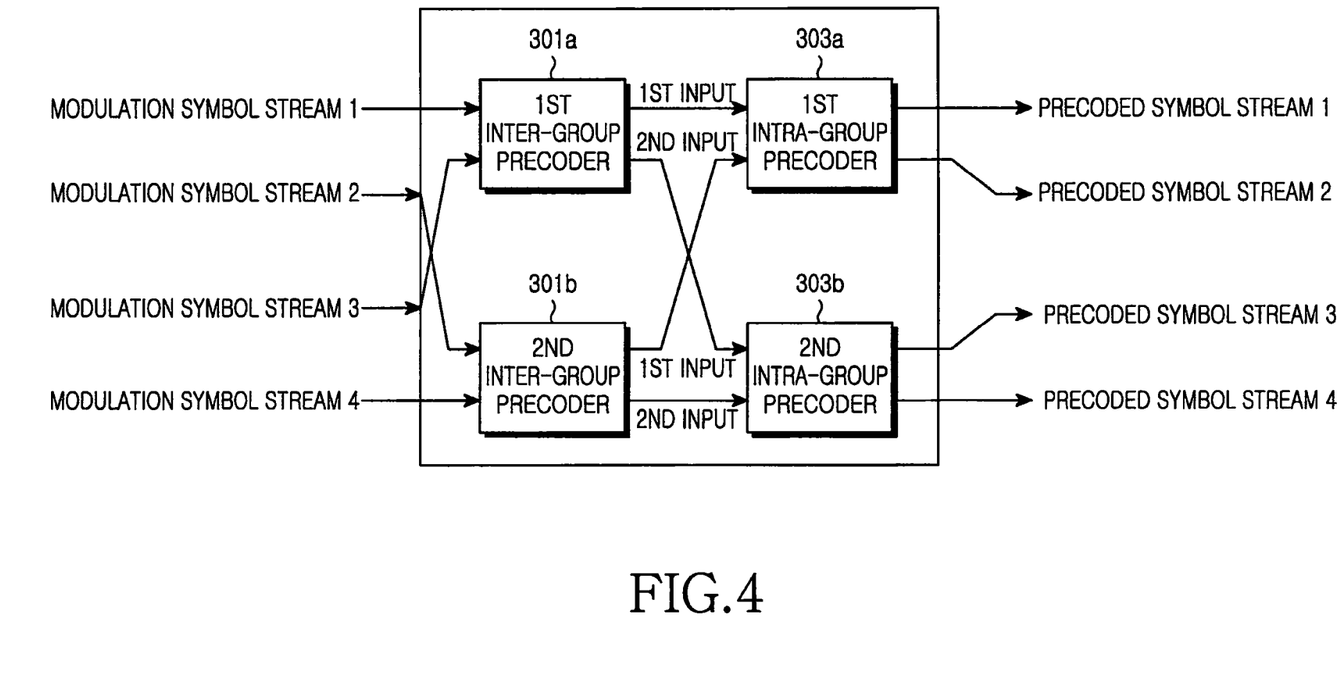
FIG. 4 is a block diagram illustrating an internal structure of a precoder according to a first embodiment of the present invention.

FIG. 4 is a block diagram illustrating an internal structure of a precoder according to a first embodiment of the present invention.

Shown in FIG. 4 is a method for constructing a precoder with Kronecker product of the intra-group precoders and the inter-group precoders. When four transmit antennas are used, a maximum of four modulation symbol streams can be transmitted, wherein the modulation symbol streams 1 and 2 form an antenna group and the modulation symbol streams 3 and 4 from another antenna group. Modulation symbol streams 1 and 3 make a pair, modulation symbol streams 2 and 4 make a pair, and the paired streams are input to first and second inter-group precoders 301a and 301b, respectively. The first and second inter-group precoders 301a and 301b perform the same function. A first output of the first inter-group precoder 301a becomes a first input of a first intra-group precoder 303a, and a second output of the first inter-group precoder 301a becomes a first input of a second intra-group precoder 303b. Similarly, a first output of the second inter-group precoder 301b becomes a second input of the first intra-group precoder 303a, and a second output of the second inter-group precoder 301b becomes a second input of the second intra-group precoder 303b. The first intra-group precoder 303a and the second intra-group precoder 303b perform the same function. The operation of FIG. 4, described above, can be expressed in a determinant as shown in Equation (11).

$$E = E_2 \otimes E_1 = \begin{bmatrix} E_1 & 0 \\ 0 & E_1 \end{bmatrix} P \begin{bmatrix} E_2 & 0 \\ 0 & E_2 \end{bmatrix} P \quad (11)$$

In Equation (11), "P" denotes a permutation matrix defined as follows:

$$P = \begin{bmatrix} 1 & 0 & 0 & 0 \\ 0 & 0 & 1 & 0 \\ 0 & 1 & 0 & 0 \\ 0 & 0 & 0 & 1 \end{bmatrix}.$$

The permutation matrix P represents an operation of inputting modulation symbol streams #2 and #3 to inter-group precoders 301b and 301a, respectively, and an operation of mapping the second output of the first inter-group precoder 301a and the first output of the second inter-group precoder 301b to the first input of the second intra-group precoder 303b and the second input of the first intra-group precoder 303a, respectively. The inter-group precoders 301a and 301b can be called external precoders according to their positions, and the intra-group precoders 303a and 303b can be called internal precoders according to their positions.

Even though the precoder is not constructed in the structure of FIG. 4, the precoder can perform the same operation using the equivalent coding matrix calculated by Kronecker product, shown in Equation (8) or Equation (10).

Figure 5:
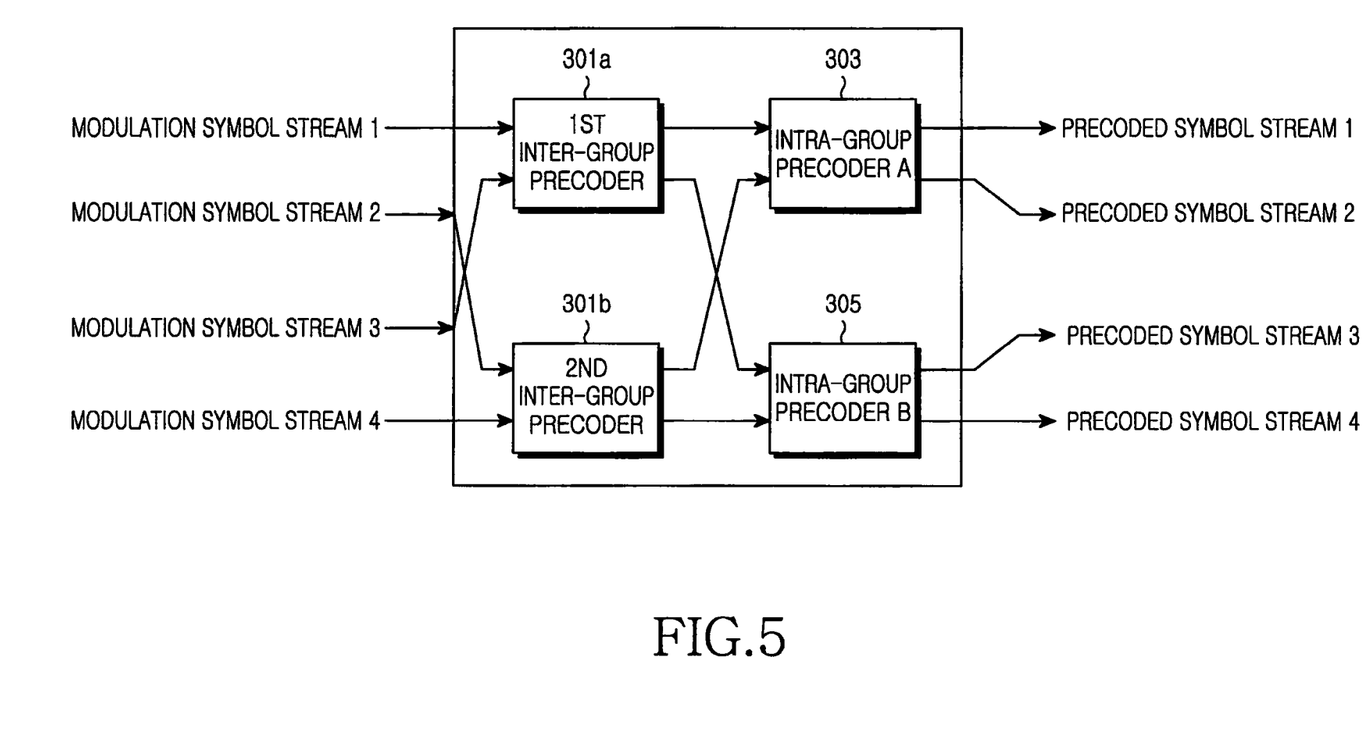
FIG. 5 is a block diagram illustrating an internal structure of a precoder according to a second embodiment of the present invention.

FIG. 5 is a block diagram illustrating an internal structure of a precoder according to a second embodiment of the present invention.

While the foregoing structure of FIG. 4 equally sets the intra-group precoders 303a and 303b, a structure of FIG. 5 differently sets the intra-group precoders for each group. If an intra-group precoder A 303 applied to an antenna group A to which precoding symbol streams 1 and 2 will be applied, uses a precoding matrix $E_1^{(A)}$, and an intra-group precoder B 305 applied to an antenna group B to which precoding symbol streams 3 and 4 will be applied, uses a precoding matrix $E_1^{(B)}$, the operation of FIG. 5 can be expressed as shown in Equation (12).

$$E = \begin{bmatrix} E_1^{(A)} & 0 \\ 0 & E_1^{(B)} \end{bmatrix} P \begin{bmatrix} E_2 & 0 \\ 0 & E_1 \end{bmatrix} P \quad (12)$$

The structure of FIG. 5 is designed taking into account the case where it is advantageous to use different beamformings as antenna groups show different spatial characteristics. The intra-group precoders 303 and 305 have the characteristics that they can form different beams.

Figure 6:
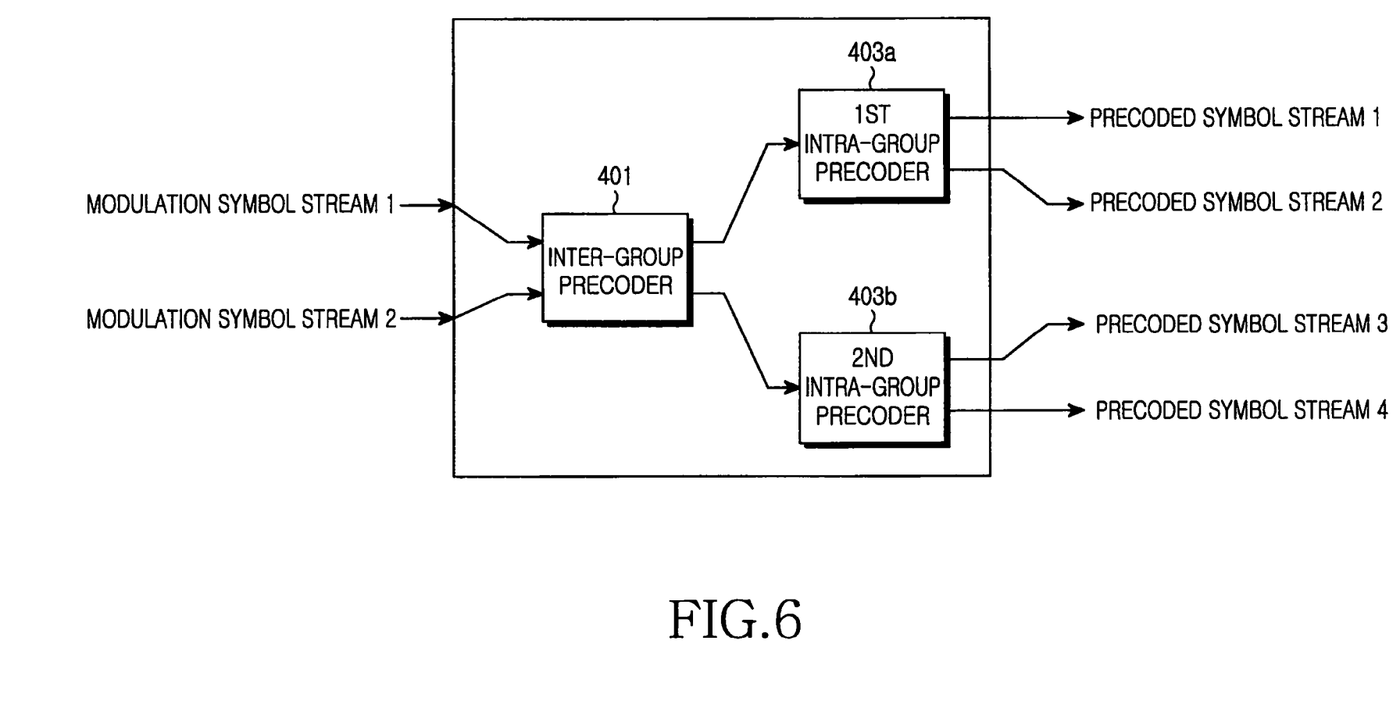
FIG. 6 is a block diagram illustrating an internal structure of a precoder according to a third embodiment of the present invention.

FIG. 6 is a block diagram illustrating an internal structure of a precoder according to a third embodiment of the present invention.

Figure 7:
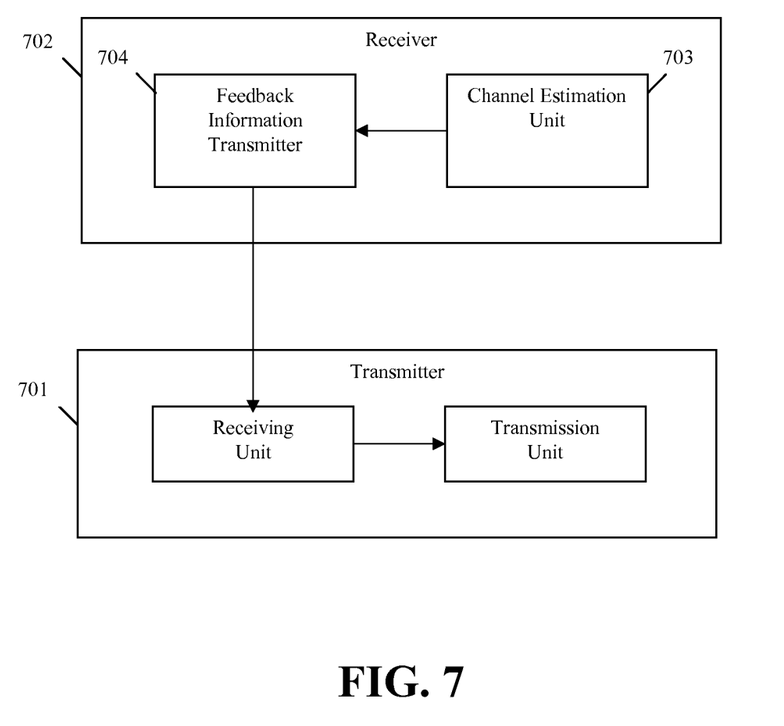
FIG. 7 is a block diagram illustrating a MIMO communication system, including a transmitter and a receiver, according to an embodiment of the present invention.

FIG. 6 illustrates a structure of a precoder suitable for the case where it is possible to transmit only one signal stream with multiple antennas in the transmit antenna group since the spatial correlation in the transmit antenna group is very high. FIG. 7 illustrates a MIMO communication system, including a transmitter 701 and a receiver 702. The receiver 701 includes a channel estimation unit 703 and a feedback information transmitter 704. The MIMO transmitter 701 generally needs Rank adaptation which is a function of adjusting the number of transmission signal streams according to the characteristic of the MIMO channel as determined by the channel estimation unit 703. If the foregoing structure of FIG. 4 has determined to transmit less than two signal streams through Rank adaptation, based on the MIMO channel estimation by the channel estimation until 703, it is preferable that its operation is modified to the operation shown in FIG. 6. A modulation symbol stream 1 and a modulation symbol stream 2 are selected by a feedback information transmitter 704 and converted into two precoded signal streams by means of an inter-group precoder 401, and are input to intra-group precoders 403a and 403b, respectively. The intra-group precoders 403a and 403b perform beamforming so that one symbol stream is transmitted by the transmitter 701 via multiple transmit antennas. If an intra-group precoder is denoted by a vector e1, the operation of FIG. 6 can be expressed in a determinant as shown in Equation (13).

$$E = E_2 \otimes e_1 = \begin{bmatrix} e_1 & 0 \\ 0 & e_1 \end{bmatrix} E_2 \quad (13)$$

The structure of FIG. 6 which is a special example of the structure of FIG. 4, can be described as an operation of FIG. 4. If the modulation symbol stream 1 and the modulation symbol stream 3 of FIG. 4 are transmitted and the modulation symbol stream 2 and the modulation symbol stream 4 are not transmitted The modulation symbol stream 1 and the modulation symbol stream 3 of FIG. 4, which correspond to a modulation symbol stream 1 and a modulation symbol stream 2 of FIG. 6, can undergo the same operation. When the MIMO transmitter performs Rank adaptation, such an operation can be performed without separate additional condition or operation.

As an example, the precoder with the structure of FIG. 6 is expressed as a precoding matrix. If an intra-group precoding vector $e_1$ and an inter-group precoding matrix $E_2$ are defined in the sets shown in Equation 14, a set of an equivalent precoding matrix E can be expressed as shown in Equation (15).

$$e_1 \in \left\{ \frac{1}{\sqrt{2}} \begin{bmatrix} 1 \\ 1 \end{bmatrix}, \frac{1}{\sqrt{2}} \begin{bmatrix} 1 \\ j \end{bmatrix}, \frac{1}{\sqrt{2}} \begin{bmatrix} 1 \\ -1 \end{bmatrix}, \frac{1}{\sqrt{2}} \begin{bmatrix} 1 \\ -j \end{bmatrix} \right\} \quad (14)$$

$$E_2 \in \left\{ 1 = \begin{bmatrix} 1 & 0 \\ 0 & 1 \end{bmatrix}, F_0 = \frac{1}{\sqrt{2}} \begin{bmatrix} 1 & 1 \\ 1 & -1 \end{bmatrix} \right\}$$

$$E \in \left\{ \frac{1}{\sqrt{2}} \begin{bmatrix} 1 & 0 \\ 1 & 0 \\ 0 & 1 \\ 0 & 1 \end{bmatrix}, \frac{1}{\sqrt{2}} \begin{bmatrix} 1 & 0 \\ -1 & 0 \\ 0 & 1 \\ 0 & -1 \end{bmatrix}, \frac{1}{\sqrt{2}} \begin{bmatrix} 1 & 0 \\ j & 0 \\ 0 & 1 \\ 0 & j \end{bmatrix}, \frac{1}{\sqrt{2}} \begin{bmatrix} 1 & 0 \\ -j & 0 \\ 0 & 1 \\ 0 & -j \end{bmatrix}, \right.$$

$$\left. \frac{1}{2} \begin{bmatrix} 1 & 1 \\ 1 & 1 \\ 1 & -1 \\ 1 & -1 \end{bmatrix}, \frac{1}{2} \begin{bmatrix} 1 & 1 \\ -1 & -1 \\ 1 & -1 \\ -1 & 1 \end{bmatrix}, \frac{1}{2} \begin{bmatrix} 1 & 1 \\ j & j \\ 1 & -1 \\ j & -j \end{bmatrix}, \frac{1}{2} \begin{bmatrix} 1 & 1 \\ -j & -j \\ 1 & -1 \\ -j & j \end{bmatrix} \right\} \quad (15)$$

As is apparent from the foregoing description, the intra-group precoders are used to obtain beamforming gain, and the inter-group precoders are used to obtain spatial multiplexing gain. In the MIMO structure, the average SINR should be high in order to increase the number of transmission signal streams, and the intra-group precoders can expect an effect of improving the average SINR through beamforming gain. Another condition for increasing the number of transmission signal streams in the MIMO structure is that the spatial correlation between transmit antenna groups should be low, and it is possible to reduce the equivalent spatial correlation between transmit antenna groups by extending the interval between transmit antenna groups. As another method for increasing the data rate using MIMO, there is a method for increasing the number of precoding cases by setting up multiple precoders applied to the channel having a low spatial correlation. The number of precoding cases increases through the precoders between the transmit antenna groups, thereby contributing to an increase in the data rate.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for transmitting feedback information from a receiver to a transmitter in a Multiple Input Multiple Output (MIMO)-based wireless communication system, the method comprising:
    estimating a state of a channel between the receiver and the transmitter, and selecting two precoding matrixes which are most preferred in the estimated channel state; and
    feeding back identification information for identifying the two selected precoding matrixes, to the transmitter,
    wherein the identification information includes one of index information for each of the two selected precoding matrixes, and index information of a precoding matrix corresponding to a combination of the two selected precoding matrixes,
    wherein the two selected precoding matrixes include a first precoding matrix used for intra-group precoding and a second precoding matrix used for inter-group precoding, and wherein the intra-group precoding and the inter-group precoding are performed using at least two antenna groups, each of the at least two antenna groups including at least two antennas, wherein the intra-group precoding is based on a high spatial correlation to a linear array antenna in a transmit antenna group of the at least two transmit antenna groups and the inter-group precoding is based on a low spatial correlation in between the at least two transmit antenna groups.

2. The method of claim 1, wherein the first precoding matrix is used to obtain beamforming gain, and the second precoding matrix is used to obtain spatial multiplexing gain.

3. An apparatus for transmitting feedback information from a receiver to a transmitter in a Multiple Input Multiple Output (MIMO)-based wireless communication system, the apparatus comprising:

a channel estimation unit for estimating a state of a channel between the receiver and the transmitter; and a feedback information transmitter for selecting two precoding matrixes which are most preferred in the estimated channel state and feeding back identification information for identifying the two selected precoding matrixes, to the transmitter, wherein the identification information includes one of index information for each of the two selected precoding matrixes, and index information of a precoding matrix corresponding to a combination of the two selected precoding matrixes, wherein the two selected precoding matrixes include a first precoding matrix used for intra-group precoding and a second precoding matrix used for inter-group precoding, and wherein the intra-group precoding and the inter-group precoding are performed using at least two antenna groups, each of the at least two antenna groups including at least two antennas, wherein the intra-group precoding is based on a high spatial correlation to a linear array antenna in a transmit antenna group of the at least two transmit antenna groups and the inter-group precoding is based on a low spatial correlation in between the at least two transmit antenna groups.

4. The apparatus of claim 3, wherein the at least two antenna groups are spaced apart by a first distance and the at least two antennas included in each of the at least two antenna groups are spaced apart by a second distance, which is shorter than the first distance.

5. A method for transmitting data at a transmitter in a Multiple Input Multiple Output (MIMO)-based wireless communication system, the method comprising:

receiving identification information for identifying two precoding matrixes, from a receiver; and transmitting data using the two precoding matrixes selected based on the identification information, wherein the identification information is information for indicating two precoding matrixes, which are most preferred by the receiver based on a channel state estimated between the receiver and the transmitter, wherein the identification information includes one of index information for each of the two selected precoding matrixes, and index information of a precoding matrix corresponding to a combination of the two selected precoding matrixes, wherein the two selected precoding matrixes include a first precoding matrix used for intra-group precoding and a second precoding matrix used for inter-group precoding, and wherein the intra-group precoding and the inter-group precoding are performed using at least two antenna groups, each of the at least two antenna groups including at least two antennas, wherein the intra-group precoding is based on a high spatial correlation to a linear array antenna in a transmit antenna group of the at least two transmit antenna groups and the inter-group precoding is based on a low spatial correlation in between the at least two transmit antenna groups.

6. The method of claim 5, wherein the first precoding matrix is used to obtain beamforming gain, and the second precoding matrix is used to obtain spatial multiplexing gain.

7. An apparatus for transmitting data at a transmitter in a Multiple Input Multiple Output (MIMO)-based wireless communication system, the apparatus comprising:

a receiving unit for receiving identification information for identifying two precoding matrixes, from a receiver; and a transmission unit for transmitting data using the two precoding matrixes selected based on the identification information, wherein the identification information is information for indicating the two precoding matrixes, which are most preferred by the receiver based on a channel state estimated between the receiver and the transmitter, wherein the identification information includes one of index information for each of the two selected precoding matrixes, and index information of a precoding matrix corresponding to a combination of the two selected precoding matrixes, wherein the two selected precoding matrixes include a first precoding matrix used for intra-group precoding and a second precoding matrix used for inter-group precoding, and wherein the intra-group precoding and the inter-group precoding are performed using at least two antenna groups, each of the at least two antenna groups including at least two antennas, wherein the intra-group precoding is based on a high spatial correlation to a linear array antenna in a transmit antenna group of the at least two transmit antenna groups and the inter-group precoding is based on a low spatial correlation in between the at least two transmit antenna groups.

8. The apparatus claim 7, wherein the antenna groups are spaced apart by a first distance and the at least two antennas included in each of the at least two antenna groups are spaced apart by a second distance, which is shorter than the first distance.

* * * * *